Figure 3:
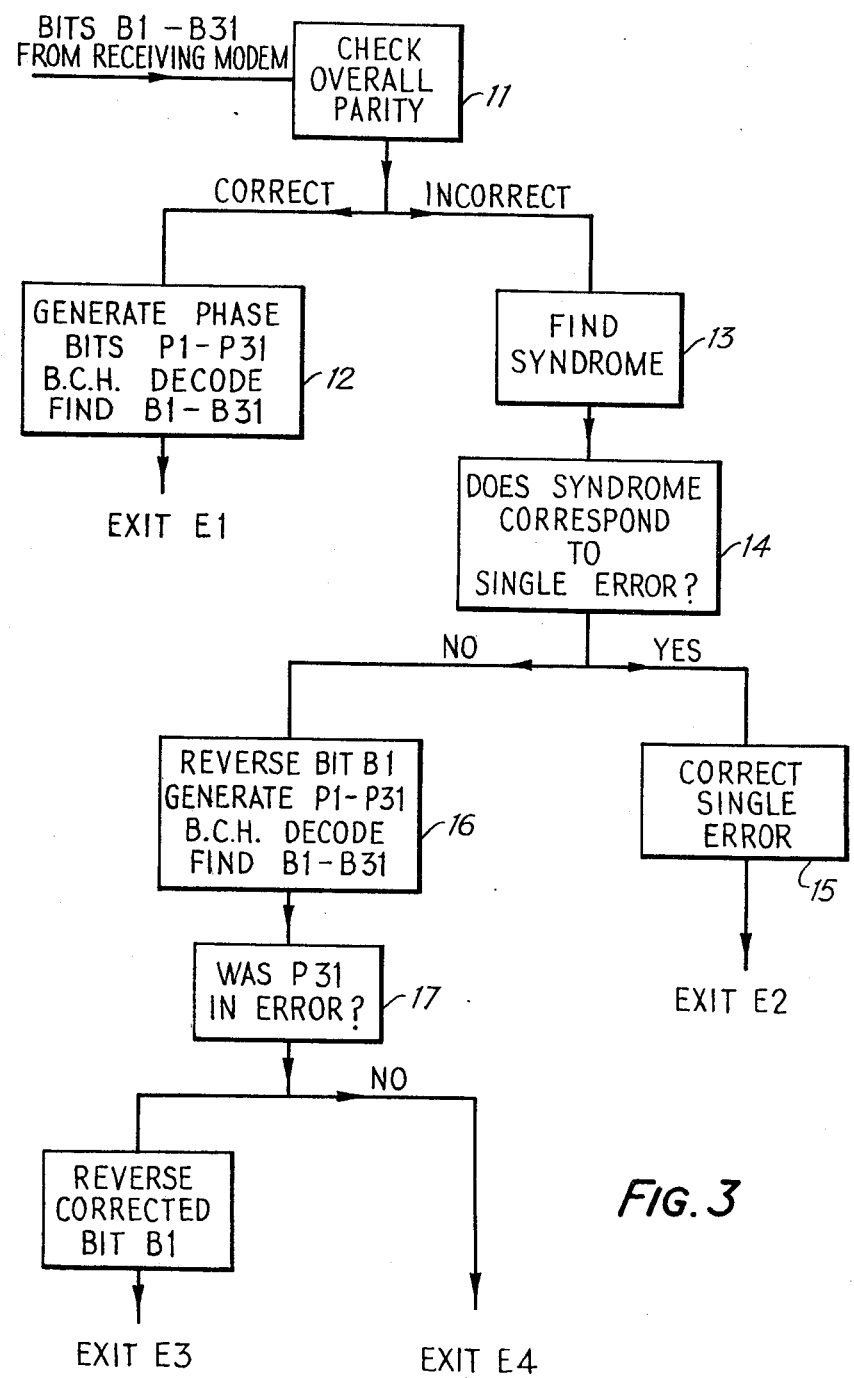

United States Patent [19]

Telfer

[11] 3,983,536

[45] Sept. 28, 1976

[54] DATA SIGNAL HANDLING ARRANGEMENTS

[75] Inventor: Charles Richard Telfer, Coulsdon, England

[73] Assignee: The Marconi Company Limited, Chelmsford, England

[22] Filed: July 3, 1975

[21] Appl. No.: 592,995

[30] Foreign Application Priority Data
July 4, 1974 United Kingdom............... 29590/74

[52] U.S. Cl. ..................................... 340/146.1 AL
[51] Int. Cl.² ..................... H04L 1/10; G08C 25/00
[58] Field of Search .......... 340/146.1 Al, 146.1 AQ, 340/146.1 AV, 146.1 R; 325/41

[56] References Cited
UNITED STATES PATENTS
3,775,746   11/1973   Boudreau et al. .......... 340/146.1 AL

*Primary Examiner*—R. Stephen Dildine, Jr.
*Attorney, Agent, or Firm*—Baldwin, Wight & Brown

[57] ABSTRACT

The invention relates to a method of correcting errors, particularly double adjacent errors, which occur in a transmission path of a data handling system. A family of error correcting codes can be used to provide a similar correcting power for such errors as conventional BCH codes have for single random errors. The invention is applicable to transmission systems in which data is present in the form of a sequence of fixed length blocks.

8 Claims, 16 Drawing Figures

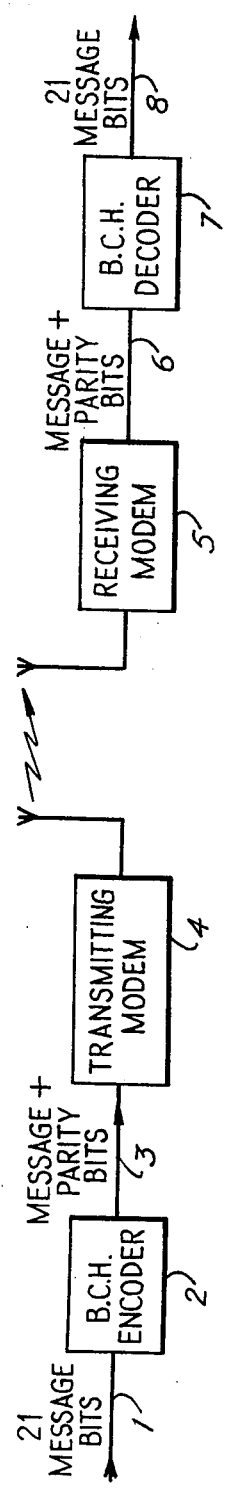
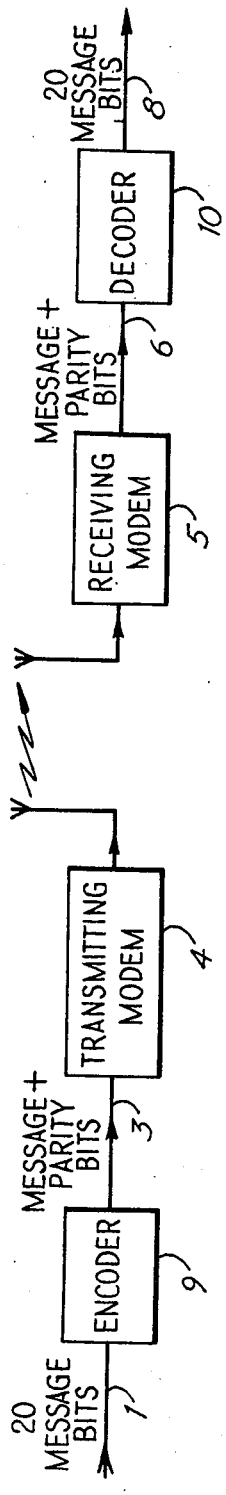

1st. ROW = $x^0$ = 0 0 0 0 0 0 0 0 0 1
2nd. ROW = $x^1$ = 0 0 0 0 0 0 0 0 1 0
⋮
10th. ROW = $x^9$ = 1 0 0 0 0 0 0 0 0 0
11th. ROW = $x^{10}$ = 1 1 0 0 0 0 0 0 0 0

= 10000000000 + 1110110 1001 = 21101101001
THUS 11th. ROW = 1101101001 = $x^{10}$ MOD G MOD 2
12th. ROW = $x^{11}$ MOD G MOD 2
= 1101101001 + 1110110 1001
= 2211211 1011 = 0110111011
13th. ROW = 1101110110 = 12th. ROW × $x$

FIG. 7

```
0 0 0 0 0 0 0 0 1        0 0 0 0 0 0 0 0 1
0 0 0 0 0 0 0 1 0        0 0 0 0 0 0 0 0 0
0 0 0 0 0 0 1 0 0        0 0 0 0 0 0 0 1 1 1
0 0 0 0 0 1 0 0 0        0 0 0 0 0 0 1 1 1 1
0 0 0 0 1 0 0 0 0        0 0 0 0 0 1 1 1 1 1
0 0 0 1 0 0 0 0 0        0 0 0 0 1 1 1 1 1 1
0 0 1 0 0 0 0 0 0        0 0 0 1 1 1 1 1 1 1
0 1 0 0 0 0 0 0 0        0 0 1 1 1 1 1 1 1 1
1 0 0 0 0 0 0 0 0        0 1 1 1 1 1 1 1 1 1
1 1 0 1 1 0 1 0 0 1      1 1 1 1 1 1 1 1 1 1
0 1 1 0 1 1 1 0 1 1      0 0 1 0 0 1 0 1 1 0
1 1 0 1 1 1 0 1 1 0      0 1 0 0 1 0 1 1 0 1
0 1 1 0 0 0 0 1 0 1      1 0 0 1 0 1 1 0 1 1
1 1 0 0 0 0 1 0 1 0      1 1 1 1 0 1 1 1 1 0
0 1 0 1 1 1 1 1 0 1      0 0 1 1 0 1 0 1 0 0
1 0 1 1 1 1 1 0 1 0      0 1 1 0 1 0 1 0 0 1
1 0 1 0 0 1 1 1 0 1      1 1 0 1 0 1 0 0 1 1
1 0 0 1 0 1 0 0 1 1      0 1 1 1 0 0 1 1 1 0
1 1 1 1 0 0 1 1 1 1      1 1 1 0 0 1 1 1 0 1
0 0 1 1 1 1 0 1 1 1      0 0 0 1 0 1 0 0 1 0
0 1 1 1 1 0 1 1 1 0      0 0 1 0 1 0 0 1 0 1
1 1 1 1 0 1 1 1 0 0      0 1 0 1 0 0 1 0 1 1
0 0 1 1 0 1 0 0 0 1      1 0 1 0 0 1 0 1 1 1
0 1 1 0 1 0 0 0 1 0   FIG.8   1 0 0 1 0 0 0 1 1 0
1 1 0 1 0 0 0 1 0 0      1 1 1 1 1 0 0 1 0 0
0 1 1 1 1 0 0 0 0 1      0 0 1 0 1 0 0 0 0 0
1 1 1 1 0 0 0 0 1 0      0 1 0 1 0 0 0 0 0 1
0 0 1 1 1 0 1 1 0 1   FIG.9   1 0 1 0 0 0 0 0 1 1
0 1 1 1 0 1 1 0 1 0      1 0 0 1 1 0 1 1 1 0
1 1 1 0 1 1 0 1 0 0      1 1 1 0 1 1 0 1 0 0
  ▼REPEATED▼             0 0 0 0 0 0 0 0 0 0
```

GENERATOR MATRIX FOR THE CODE USING THE FIRST BIT AND THE LAST TEN BITS AS PARITY BITS

FIG. 10

DATA SIGNAL HANDLING ARRANGEMENTS

This invention relates to signal handling arrangements.

It is common in, for example, telegraphy circuits where a good degree of accuracy is required in the final output signal to employ error correction coding techniques in order to enable a receiver to correct errors occurring during transmission. There are a number of well known techniques in use for permitting correction of errors occurring at random which involve adding redundant error correcting signals to a message. There are, in fact, families of error correcting codes which are used for this purpose and one well known such family are the BCH codes.

In BCH codes, the message data stream is divided into blocks each consisting of K message bit signals. Added to each of these blocks are (N - K) so called parity bits which are calculated by a specified procedure of matrix multiplication modulo 2 from the message bits. After addition of the parity bits, the total block of N bits is transmitted. For each combination of N and K there is a number T such that any pattern of T errors, or less, in a block of N bits can be successfully corrected at the receiver. To quote a typical example, if N equals 31 and K equals 21, then T equals 2. That is to say, one can add 10 parity bits to any word of 21 message bits in such a manner that at the receiver any two errors occurring at random in the overall word of 31 bits can be corrected.

In practice, errors rarely occur at random and taking as an example the case of telegraphy systems employing delta phase shift keying (DPSK) there is a predominance of what are known as double adjacent errors i.e. error pairs. This element of predictability is not in any way acknowledged nor made use of in random error correcting codes.

Other techniques are also known for correcting errors occurring in pairs or in bursts. One such technique is to interleave the bit sequence such that bits which are adjacent at the output of the receiving modem (modulator/demodulator) are decoded in different blocks. This has the disadvantage that the correlation properties of the sequence may require interleaving over very considerable intervals of time in order to obtain reasonably satisfactory results.

A further known technique involves the use of families of codes designed to cope with error bursts such as the Abramson codes. Abramson codes are designed to correct for either one signal error or one error pair. In the case of the Abramson codes, when the size of each block is 31 bits 25 of these bits are signal bits and the other 6 consist of parity bits. On the face of it, this represents a significant improvement over the BCH codes. However, the codes suffer from the disadvantage of being incapable of correcting more than one error pair in a block.

According to the present invention, there is provided a method of data handling for correcting errors arising in a transmission channel in a system in which double adjacent errors are predominant, in which method a codeword of N bits $B_1$ to $B_n$ is transmitted to represent each block of K data bits, the bits $B_1$ to $B_n$ of the transmitted codeword being related to the bits $P_1$ to $P_n$ of a codeword of any code capable of correcting errors occurring at random by the fact that the $i^{th}$ term $P_1$ is equal to the cumulative sum modulo 2 of the first $i$ terms $B_1$ to $B_i$ and in which, upon reception, the codeword $P_1$ to $P_n$ or its inverse is recorded by cumulatively summing received bits $B_1$ to $B_n$, and decoded to correct for errors occurring during transmission, and arrangement being such that the introduction by the transmission channel of a double adjacent error into the sequence $B_1$ to $B_n$ results in a change in only one of the bits of the recovered codeword.

Preferably, the bits $P_1$ to $P_n$ are the codewords of a BCH code.

The invention finds particular application in communication systems using delta phase shift keying in which the phase shift between consecutive bits represents the value of the bit. For example, if a bit is out of phase with the preceding bit it may represnt a binary '1' whereas if it is in phase it represents a binary '0'.

Preferably, again the bits of the word $B_1$ to $B_n$ are so chosen that the last bit in each of the codewords $P_1$ to $P_n$, i.e. the bit $P_n$, has the same value, i.e. 1 or 0, for each of the codewords so that the parity of the codewords may be checked to detect whether an odd or even number of errors has occurred in transmission.

It is also preferable that the code to which the codewords $P_1$ to $P_n$ belong should be such that if any word belongs to the code then so does its inverse.

Figure 4:
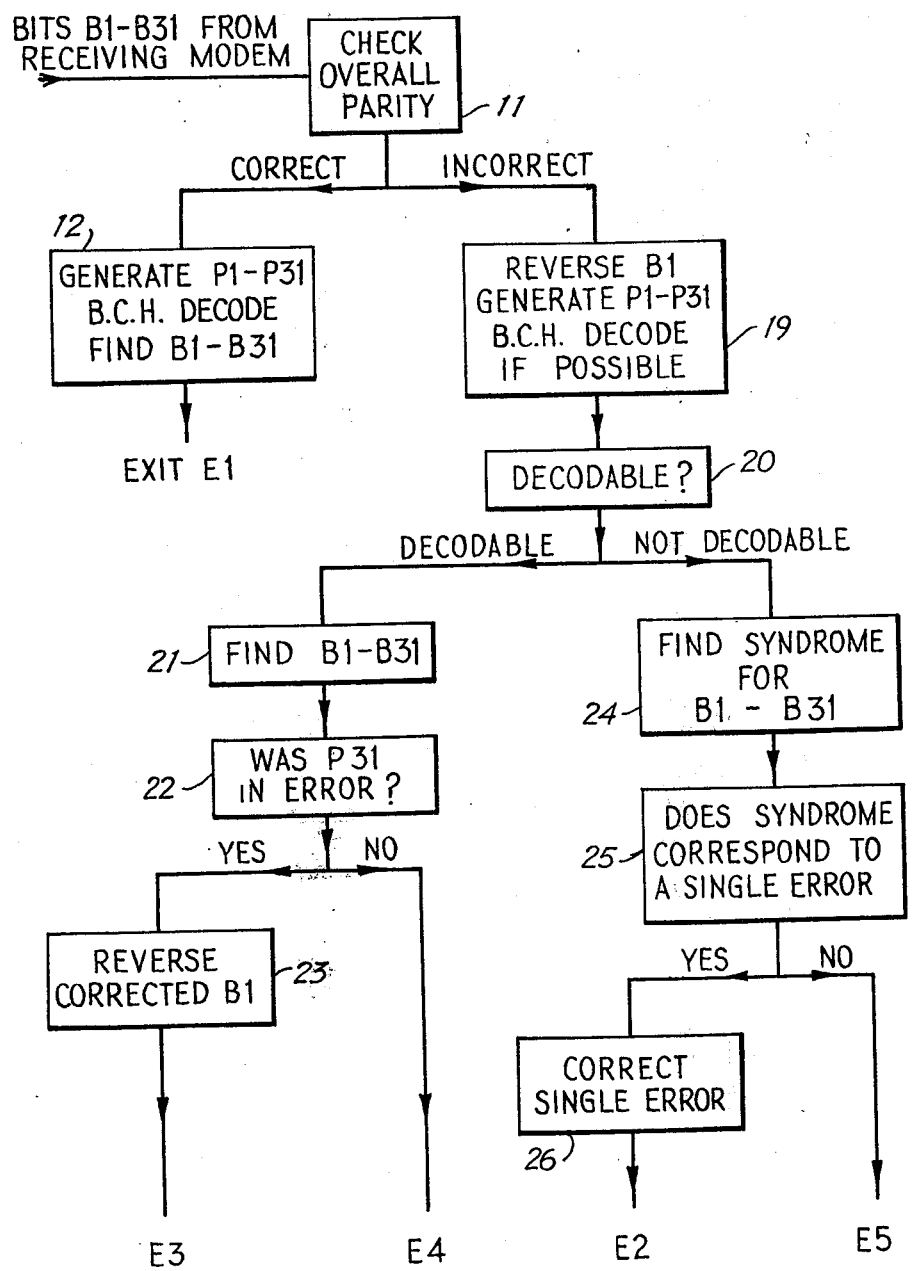
Figure 11:
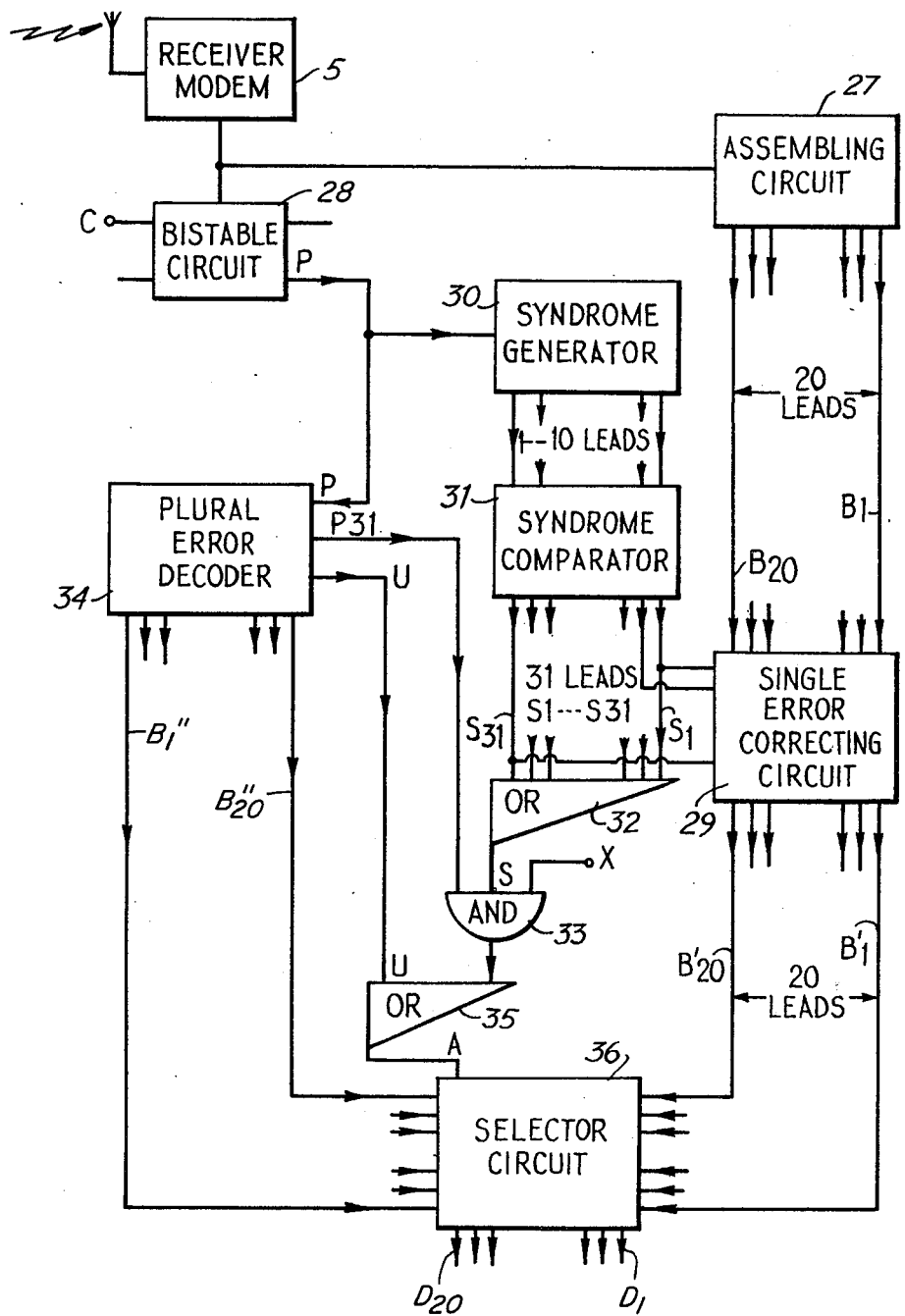
Figure 12:
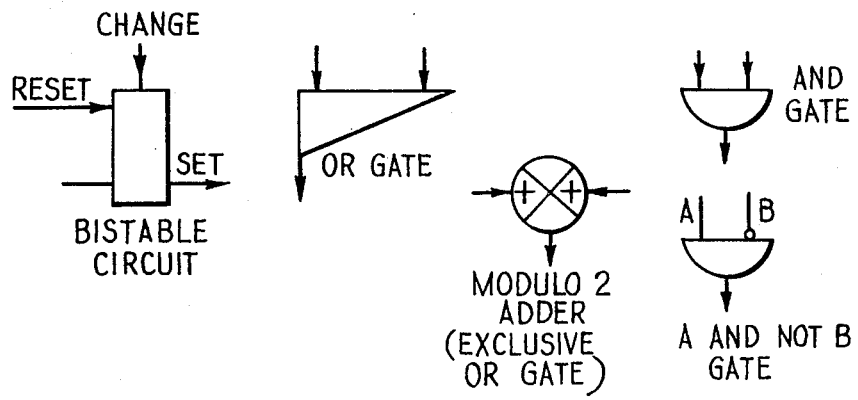
Figure 14:
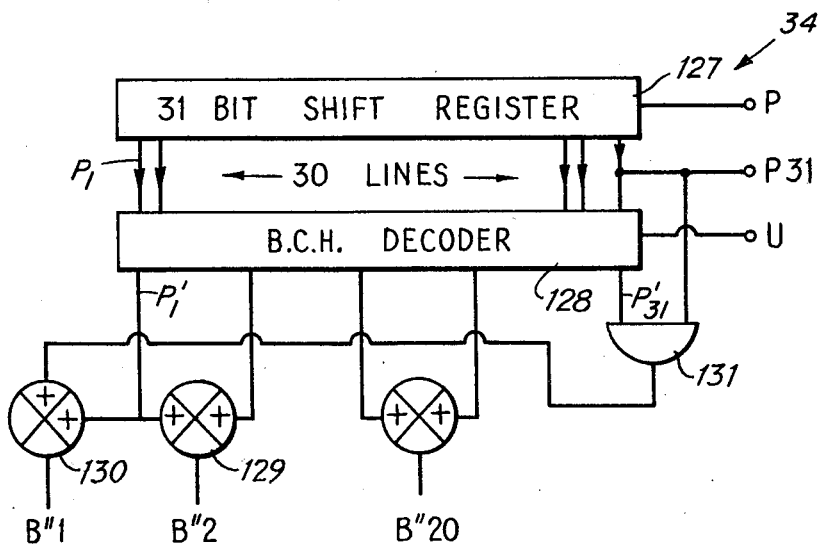
Figure 15:
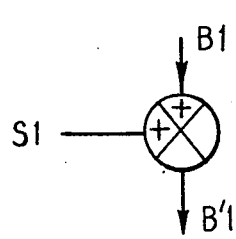
Figure 16:
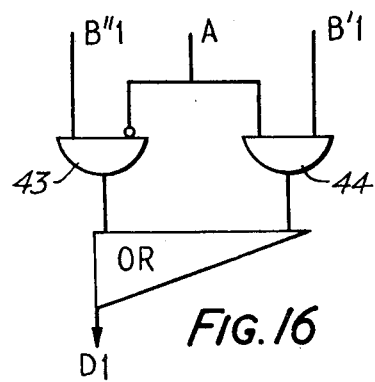
Figure 13:
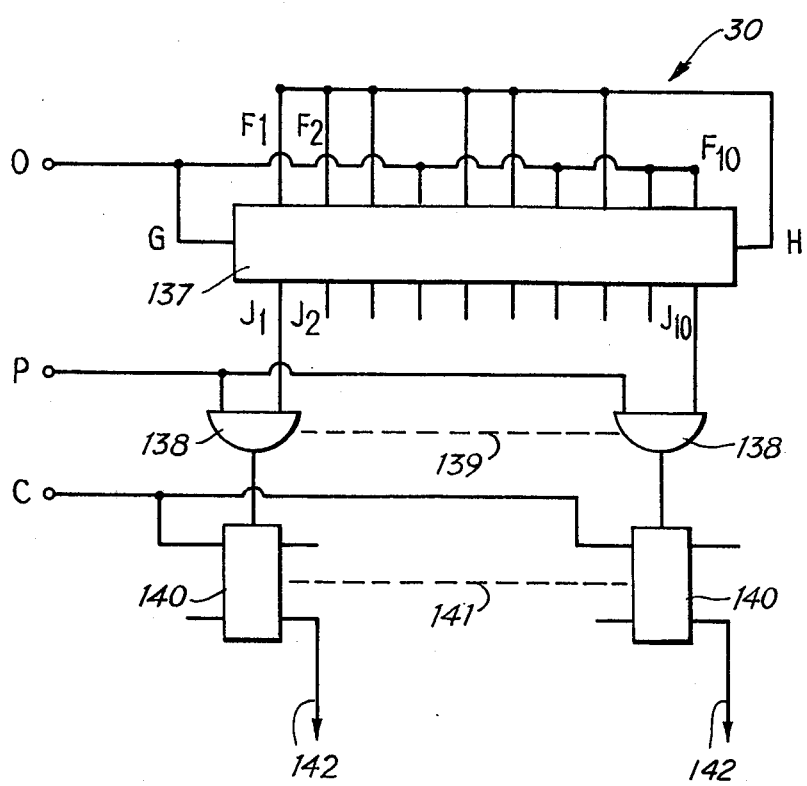

The invention is further described, by way of example, with reference to the accompanying drawings in which, FIG. 1 is a highly schematic block diagram of a known data signal arrangement, FIG. 2 is a highly schematic block diagram of a data signal arrangement in accordance with the present invention, FIGS. 3 and 4 are block diagrams illustrating two different manners of operation of the decoder 10 of FIG. 2, FIGS. 5 to 10 illustrate the mathematical operation involved in the design of encoders 2 and 9 of FIGS. 1 and 2, FIG. 11 is a block diagram of the receiving arrangement of FIG. 2, FIG. 12 is an explanatory diagram explaining symbols used in the Figures, FIG. 13 is a block diagram showing in more detail the syndrome generator 30 in FIG. 11, FIG. 14 is a block diagram showing in more detail the plural error decoding circuit 34 of FIG. 11, FIG. 15 shows an individual correction circuit as used in the single error correcting circuit 29 of FIG. 11, and FIG. 16 a schematic diagram of an individual selector unit as used in selector circuit 36 of FIG. 11.

Referring to FIG. 1, the known data transmission system illustrated therein uses BCH coding in order to provide the facility of error detection and correction. A message stream of K bits, in this case twenty-one, is applied via lead 1 to a BCH encoder 2 of known form, in which a number (N - K), which in this case equals 10, of parity bits are added in accordance with a BCH code. On the output lead 3 from BCH encoder 2 there appear codewords each of 31 bits, 21 of which are message signal bits and ten of which are parity bits. Lead 3 is connected into a transmitting modem 4, which transmits the codewords to a receiving modem 5. On the output lead 6 of the receiving modem 5, codewords appear which correspond to the codewords on lead 3 of the transmitter but may include errors occurring during transmission. Lead 6 is connected to the input of a BCH decoder 7, which decodes the received blocks in accordance with known BCH techniques to provide on output lead 8 blocks of message bits corresponding to the blocks of message bits applied to lead 1 of the transmitter.

Referring to FIG. 2, so far as its block schematic form is concerned the system is similar to that shown in FIG. 1 except that encoder 2 and decoder 7 are replaced by an encoder 9 and a decoder 10 which will be discussed in detail later and the message signal bits applied to lead 1 are divided into blocks each of twenty bits, there being, for reasons which will be explained later, one additional parity bit added in the encoder 9 as compared with the number of parity bits added in the encoder 2 of FIG. 1. On leads 3 and 6, therefore, there will still be blocks each of 31 bits, but in this case made up of 20 message bits and 11 parity bits.

In order to describe in general terms the design of encoder 9, it is useful firsly to consider the following. Supposing one is transmitting a sequence, say 0101, using DPSK modulation. If a binary 1 is represented by a change of phase in the carrier frequency of $\pi$ radians relative to the phase in the previous bit, and a binary 0 is represented by no phase change, then, assuming the carrier frequency initially to be in phase with a reference oscillator, the sequence of the phase will subsequently be 0, $\pi$, $\pi$, 0 which may, in turn, be considered a binary sequence 0 1 1 0. Thus, if one transmits the bits $B_1$ to $B_n$, the phase of the carrier frequency will follow some sequence $P_1$ to $P_n$ which is related to the sequence $B_1$ to $B_n$ by the equations $$P_1 = P_0 + B_1$$

$$P_2 = P_1 + B_2$$

.
.
.

$$P_n = P_{n-1} + B_n$$

(+ signifies the operation sum modulo 2)

If one now considers the effect of one phase bit $P_r$ being changed erroneously by the process of transmission, it will be noticed that two bits of the received information $B_r$ and $B_{r+1}$ are in error. This is the reason for the predominance of double adjacent errors in DPSK modulation.

In the present invention, the encoder produces for each block of data, a codeword $B_1$ to $B_n$ which is such that the phase bits $P_1$ to $P_n$, which are transmitted when DPSK modulation is used, form a codeword of an error correcting code, such as a BCH code, which is capable of correcting errors occurring at random. In this manner, in the event of double adjacent error when on receiving the sequence $B_1$ to $B_n$ after transmission one computes from the received bits the sequence $P_1$ to $P_n$, (or its inverse depending on whether the phase of the first bit is correctly predicted), the result obtained is a codeword of the selected code with only single errors. Thus, the power of the random error correcting code is increased to enable it to cope with double adjacent errors. Single errors, on the other hand, may be detected and corrected by operating directly on the words $B_1$ to $B_n$.

In the case set out above, each block of twenty digits is transformed into a unique codeword consisting of 31 bits $B_1$ to $B_{31}$. These are transmitted and the received codeword appearing at the output of the receiving modem 5 should ideally follow the same sequence though it may contain errors, usually in pairs. From the received codeword the terms $P_1$ to $P_{31}$ (or their inverse) are recovered by a process of cumulative summing and these computed bits constitute a word of a random error correcting code, such as a BCH code, with a single error for each error pair in the codeword $B_1$ to $B_{31}$. Such errors may now be detected and corrected by standard BCH techniques.

Though the steps described so far are sufficient to cope with errors occurring in pairs, mistakes can occur if errors occur singly. It is therefore preferable to have means for ensuring that any errors present are in pairs and this can best be done by checking the parity of the received codeword. If all the transmitted codewords are of the same parity then should an odd number of errors occur during transmission the received codeword would be of the opposite parity. It is with a view to ensuring that all the transmitted codewords are of the same parity that the codes in the preferred embodiment require one extra parity bit. It will be appreciated that even in a system where only double adjacent errors can occur it is nevertheless possible for a single error to occur in a codeword since the double adjacent error might fall one half in each of two adjacent codewords.

Referring now to FIG. 3, the logical flow diagram shown therein illustrates the steps involved in the decoding process of decoder 10. Firstly, the parity of the bits $B_1$ to $B_{31}$ derived from the receiving modem 5 is checked within the block designated 11. If the parity is correct (indicating that the number of errors is even) $P_1$ to $P_{31}$ are determined and decoded in accordance with BCH techniques to produce (if possible) a correct sequence $P_1$ to $P_{31}$ which is then converted back to a sequence $B_1$ to $B_{31}$ which is fed out as desired output at exit E1. These operations are carried out within the block labelled 12.

If, on the other hand, the parity check (block 11) shows that parity is not correct (odd number of errors) the error syndrome is determined in block 13. From the syndrome it is possible to determine whether there is a single error or a multiplicity of errors. This assessment is made in the block labelled 14. If the syndrome does correspond to a single error, the single error is corrected in block 15 to provide at exit E2 the desired output signal sequence. If, however, the syndrome does not correspond to a single error then bit $B_1$ is reversed and phase bit sequence $P_1$ to $P_{31}$ is determined from the sequence $B_1$ to $B_{31}$ with bit $B_1$ reversed. The determined sequence $P_1$ to $P_{31}$ is BCH decoded and subsequent to correction of any errors the recovered sequence $P_1$ to $P_{31}$ is converted back to $B_1$ to $B_{31}$. It is then determined in block 17 whether the bit $P_{31}$ was in error. If $P_{31}$ was not in error the sequence $B_1$ to $B_{31}$ produced at the output of block 16 is provided as the desired output at exit E4. If, however, $P_{31}$ was in error bit $B_1$ in the output sequence $B_1$ to $B_{31}$ provided at 16 is again reversed. This operation is carried out within block 18 and the sequence thus formed is provided as desired output at exit E3.

A decoder as above described with reference to FIG. 3 has the ability to correct the following error patterns:
 1. any single error,
 2. one or two error pairs (i.e. a total of 2 or 4 bits in error), 3. an error pair with a single error at either the beginning or the end,
4. the majority of cases of two error pairs with a single error at the beginning (i.e. $B_1$).

Referring to FIG. 4, the logical flow diagram shown therein relating to the detector 10 assumes isolated single errors may be neglected. In this case, the overall parity of the bits $B_1$ to $B_{31}$ applied to the decoder 10 is again checked at 11. If parity is correct, phase bits $P_1$ to $P_{31}$ are determined, the phase bits $P_1$ to $P_{31}$ are BCH decoded to provide a correct sequence of $P_1$ to $P_{31}$ and the correct phase sequence $P_1$ to $P_{31}$ is converted back to provide a corrected sequence $B_1$ to $B_{31}$ which is provided as desired output at exit E1. Again this is represented by block 12.

If, on the other hand, the parity check on 11 shows that parity is not correct, bit $B_1$ of the sequence $B_1$ to $B_{31}$ is reversed, the phase bit sequence $P_1$ to $P_{31}$ is then determined from the bit sequence $B_1$ to $B_{31}$ thus produced and this is BCH decoded if possible. This is represented by block 19.

It is then determined whether the sequence $P_1$ to $P_{31}$ in block 19 was decodable. This is represented by block 20. If it was decodable, the corrected sequence $P_1$ to $P_{31}$ is converted back to provide a corrected sequence $B_1$ to $B_{31}$. This is represented by block 21. It is then determined in block 22 whether bit $P_{31}$ was in error. If $P_{31}$ was not in error the corrected sequence $B_1$ to $B_{31}$ formed at the output of block 21 is provided as the desired output at exit E4. If on the other hand it is determined in block 22 that bit $P_{31}$ was in error, the bit $B_1$ of the sequence provided at the output of block 21 is reversed and the sequence $B_1$ to $B_{31}$ thus formed is provided as desired output at exit E3. This is represented by block 23.

It is is determined in block 20 that the sequence $P_1$ to $P_{31}$ in block 19 was not decodable, the error syndrome for sequence $B_1$ to $B_{31}$ is determined in block 24 and from this it is decided in block 25 whether or not the sequence $B_1$ to $B_{31}$ can be considered to contain only one error. If the syndrome determined by block 24 does not correspond to a single error then the sequence $B_1$ to $B_{31}$ is provided as the desired output at exit E5. If, on the other hand, the syndrome determined at 24 does correspond to a single error, then a correction is applied and the sequence $B_1$ to $B_{31}$ is provided as useful output at exit E2. This is represented by block 26. With a detector 10 as described with reference to FIG. 4, the facilities provided are capable of correcting the following error patterns:

1. 20 of 31 possible single errors,
2. one or two error pairs,
3. one error pair with a single error at either the beginning or the end (i.e. $B_1$ or $B_{31}$),
4. one or two error pairs with a single error at the beginning (i.e. $B_1$)

Before considering the practical aspects of the decoding arrangement of FIG. 2 in more detail, a mathematical example of the manner in which the encoder 9 is designed to operate will now be given with reference to FIGS. 5 to 10.

The BCH codes for blocks of 31 bits are based on polynomials of degree 5 (i.e. $\log_2 (N + 1)$).

One of these is $x^5 + x^2 + 1$ which may also be written as $1 \cdot x^5 + 0 \cdot x^4 + 0 \cdot x^3 + 1 \cdot x^2 + 0 \cdot x^1 + 1 \cdot x^0$ or 100101. Three such polynomials are given in FIG. 5 and for a two error correcting code the generator polynomial $G(x)$ is the product modulo 2 of two consecutive such polynomials as illustrated in FIG. 6. The check matrix rows are the powers of $x$ modulo $G(x)$ and 2, i.e. the $(n + 1)$th row is $P_3(x)$ such that $P_3$ is the polynomial of least degree which satisfies $x^n = P_1(x)$. $G(x) + P_2(x) \cdot 2 + P_3(x)$ when all coefficients are integers and $P_3$ has only non-negative coefficients less than 2 (0 or 1). Examples are given in FIG. 7 and the full matrix in FIG. 8. If the matrix of FIG. 8 is rotated 90° clockwise the check matrix is seen in its more usual presentation with the last row of FIG. 8 being the first column. A check matrix has the property that if a codeword of the code described by the check matrix is compared with some column, say column $\alpha$ of the matrix then an even number of 1's in one will coincide with 1's in the other. In other words (column $\alpha$) and (codeword) contains an even number of 1's and has even parity. It would be possible to construct codes in which some columns gave odd parity but these can be considered by adding a notional 1 to each codeword and a row to the check matrix so as to make all parities even. If two columns of a check matrix are exchanged or one is added modulo 2 to another then the result is also a check matrix of the same code but only one check matrix will contain a unit matrix over the chosen parity bits. If this unit matrix is removed then the result is the generator matrix for the code. Considering the sample BCH code using the last 10 bits as parity bits, the matrix of FIG. 8 is the check matrix which is the generator matrix plus a unit matrix. If a block (which may be a codeword) is compared with each column of a check matrix then the pattern of parities produced is the syndrome and if the block is a codeword then the syndrome will be zero (i.e. all even). If the block is a codeword to which has been added an error within the correction capability of the code then the syndrome will be non-zero and characteristic of that error. No two errors within the capability of the code will give the same syndrome. It is possible that two errors having the same syndrome are of interest. In this case one may place either error within the correction capability of the code but not both. Alternatively one may place both errors within the detection capability of the code and neither within the correction capability. For example, the sample code there are 11 cases in which a single error in the middle of a block gives the same syndrome as a single error in the first bit plus two double adjacent errors so that if one receives a block having one of these 11 syndromes then one may consider that one has the single error and correct accordingly or consider that one has the compound error and correct accordingly or consider that one has an unknown error and make no correction. Thus the capabilities of a code are to a certain extent a matter of choice at the decoder. The syndrome also depends on which check matrix is used, but there is a 1 to 1 correspondence between the syndrome of different check matrices for the same code.

In generating a new code from some other code (in the present example correcting BCH code is used) the first step is to take some check matrix of the original code and replace each row by the sum modulo 2 of that row and all preceding rows as shown in FIG. 9. A pattern of double adjacent errors produces the same syndrome from the matrix of FIG. 9 as would have been produced by the corresponding single errors from the original matrix of FIG. 8, e.g. errors in bits 4 and 10 produce 1000101100 by summing the 4th and 10th rows from the bottom of the matrix in FIG. 8. The double adjacent errors starting in these bits are errors in bits 4, 5, 10 and 11 and produce the same syndrome from the new matrix by a similar summation. Note that a double adjacent error starting in the last bit is, as far as this block is concerned, a single error in the last bit and this gives the same syndrome from the matrix of FIG. 8 or FIG. 9. Therefore the code described by FIG. 9 has the same capability against double adjacent errors starting in the block as the original code has against single errors. There remains the problem of a double adjacent error starting in the last bit of the previous block and producing an error in the first bit of this block. The syndrome of such an error is zero so an error in this bit need not affect the decoding of the rest of the block, i.e. an error in this bit does not at this stage affect the syndrome. There are a number of different ways in which one may combat the problem. One solution is to assume that only double adjacent errors can occur so that if the decoding of the previous block indicates an error starting in the last bit of that block then the first bit of this block is changed before or after decoding. Other methods amount to adding another column to the check matrix with 1 in the last row. If the other elements are 0 the first bit becomes constant. This reduces the efficiency but eliminates the need to carry information from one block to another. If the other elements are 1, this also reduces the efficiency but introduces a capability for combating single errors. T$_o$ the capability to correct 0, 1 or 2 double adjacent errors with or without an error in the first bit one has added the capability to correct a single error except that, as previously mentioned, in 11 cases in the example a single error has the same syndrome as a single error in the first bit plus two particular double adjacent errors. In the conversion, there remains the task of finding the check matrix which contains a unit matrix over the chosen parity bits. In the example the subclass chosen is the last mentioned and the matrix of FIG. 9 is followed by a column of 1s. The first bit and the last 10 can be chosen as parity bits since this involves a particularly simple conversion which is performed by adding each column to the next to the right to produce the matrix of FIG. 10. If the last column of the matrix of FIG. 10 is transferred to before the others and added to every column with a 1 in row 11 then the first 11 rows will be a unit matrix and the remainder will be the generator matrix for the code using the last 11 bits as parity bits.

Referring now to FIG. 11, receiver modem 5 applies streams of bits $B_1$ to $B_{31}$ received, uncorrected, both to an assembling circuit 27 and to a bistable circuit 28. Assembling circuit 27 has 20 output leads $B_1$ to $B_{20}$ and is such as to assemble in sequence the message bits within a received block of bits. The output leads $B_1$ to $B_{20}$ of assembling circuit 27 are connected to a like number of input terminals of a single error correcting circuit 29, which has 20 output leads $B'_1$ to $B'_{20}$. Bistable circuit 28 acts to generate from the uncorrected received bits $B_1$ to $B_{31}$, the bits $P_1$ to $P_{31}$ in series. These generated bits $P_1$ to $P_{31}$ are applied from bistable output terminal $p$ to a syndrome generator 30, which as is shown in more detail in FIG. 13 contains a 10 bit shift register. The register in syndrome generator 30 is re-set at the beginning of each block period by re-set signals from a clock generator (not shown) applied to re-set terminal C. Syndrome generator 30 has 10 output leads 142 which are connected to a like number of input terminals of a syndrome comparator 31, having 31 output leads $S_1$ to $S_{31}$ which are connected to control the operation of the single error correcting circuit 29. Output leads $S_1$ to $S_{31}$ of syndrome comparator 31 are also connected to different input terminals of an OR gate 32, the output lead of which is connected to one input terminal of an AND gate 33. AND gate 33 has two further input leads one marked X, the purpose of which will be described hereinafter and the other connected to an output lead marked $P_{31}$ from a plural error decoding circuit 34 which is shown in detail in FIG. 14. Plural error decoding circuit 34 derives bit signal input from the output lead $p$ of bistable circuit 28. Plural error decoding circuit 34 provides a further control signal on output lead U which is applied to one input terminal of an OR gate 35, a second input terminal of which is derived from the output terminal of AND gate 33. Plural error decoding circuit 34 also has 20 output leads $B''_1$ to $B''_{20}$, each of which bears in operation corrected message bit signals in a block. The 20 output leads $B''_1$ to $B''_{20}$ of plural error decoding circuit 34 are applied as one block input to a selector circuit 36 to which as a second block input the output leads $B'_1$ to $B'_{20}$ of single error correcting circuit 29 are connected. Selector circuit 36 consists of individual selector circuits, one for each pair of output leads to be selected between, each as shown in detail in FIG. 16; which of the aforementioned two blocks selector circuit 36 selects, is under the control of a signal applied to control terminal A from the output terminal of OR gate 35. Selector circuit 36 has 20 output leads referenced $D_1$ to $D_{20}$ which in operation contain corrected message bit signals from a block for utilisation.

It may be noted that assembling circuit 27, single error correcting circuit 29, syndrome generator 30 and syndrome comparator 31 are similar to corresponding circuits to be found in a conventional BCH decoder.

Referring to FIG. 13, this as previously mentioned, shows in more detail the syndrome generator 30 of FIG. 11. The syndrome generator consists of a 10 bit shift register 137 which is clocked on at the bit rate of the received signal. Without the lines F, this is normal shift register such that each clock pulse causes each stage to take up the information previously held in the preceding stage. The first stage takes up the information from the input line G and the last stage outputs its previous information on line H. The contents of the register can be read off in parallel on lines J. The function of lines F is that after information has shifted, the information in any stage for which the line F holds a 1 is inverted. In this application, certain lines F including $F_1$ are connected to the output H and the other lines F are connected to the input G which carries a 0. The number of stages equal to the number of parity bits in the original code and the connections of the F lines depends on that code. When the transmission of information starts, the contents of this register must be set for the first bit. Once the contents are correct for one bit, each clock pulse will cause the next syndrome to be generated. The example given is for when the original code is the BCH (31, 21) 2-EC code based on the matrix in FIG. 8 which requires that when $P_{31}$ arrives on line P the contents of the register should be 1 in the last stage and 0 elsewhere; this is the first row of FIG. 8, the syndrome for $P_{31}$. The connections are such that the first stage contains the previous contents of the last stage, the second stage contains the previous contents of the first and last stages summed modulo 2 and the fourth stage contains the previous contents of the third stage. Each of the lines J is connected to an input terminal of a different AND gate 138 of which only the first and last are shown the others being represented by a dashed line 139. The second input terminals of the AND gate 138 are connected in parallel to the output terminal p of the bistable circuit 28 of FIG. 11.

The output terminals of each of the AND gates 138 are connected to different ones of 10 bistable circuits 140. Again only the first and last of the bistable circuits 140 are shown, the others being represented by the dashed line 141. Each of the bistable circuits 140 is connected to be reset by signals applied to lead C at the end of each block period. The output leads 142 of the bistable circuits 140 together constitute ten output leads of the syndrome generator 30 of FIG. 11, which are connected to the syndrome comparator 31.

Referring to FIG. 14, as has already been mentioned this shows in more detail the plural error decoding circuit 34 of FIG. 11. The apparatus comprises a 31 bit shift register 127 which after receiving 31 bits in series applies these bits in parallel to a BCH decoder 128. The decoder outputs the corrected codeword $P'_1$ to $P'_{31}$ and from it the first 20 digits of the codeword $B_1$ to $B_{31}$ are computed by means of a set of adders two of which are indicated by reference characters 129 and 130. This operation corresponds to the block labelled 12 in FIGS. 3 and 4.

Supposing, however, that the parity is incorrect. This will show up in that the bit $P_{31}$ will now differ from its correct value since the bit $P_{31}$ is obtained by cumulatively summing all the bits $B_1$ to $B_{31}$ and therefore represents the parity of the received $B_1$ to $B_{31}$. In this case, as has already been mentioned in describing the blocks 16 and 19, one should reverse the bit $B_1$ if one wishes to generate the correct $P_1$ to $P_{31}$.

Now, if one were to reverse $B_1$ and regenerate the contents of the shift register 127, the sequence would be the complement of the sequence which has in fact arrived in the shift register. In other words, the shift register contains the inverses of $P_1$ to $P_{31}$. If the complementary sequence is applied as input to the BCH decoder 128, then the output would consist of the inverses of the corrected sequence. This is because the operation of BCH decoding and complementing are commutative (by which is meant that the order in which the operations are performed does not affect the result) the fact that the output of the BCH decoder 128 is the complement of what the output should be, does not affect any of the bits $B''_2$ to $B''_{31}$ since the sum modulo 2 of two bits is not changed if one inverts both bits. The only bit of the output that is affected is therefore the bit $B''_1$. Hence, to derive the bit $B''_1$ the first adder 130 is connected to receive the output $P''_1$ from the BCH decoder 128 and the output of an AND gate 131 connected to receive the bit $P'_{31}$ entering the BCH decoder 128 and the corrected bit $P_{31}$.

If the bit $P_{31}$ is not in error then the line $P_{31}$ and the corresponding decoder output $P'_{31}$ will both carry a logic 1. The AND gate 131 will pass this 1 to the sum modulo 2 adder 130 which will therefore invert the first bit $P'_1$ from the decoder 128 and pass it on as the corrected bit $B''_1$.

If, on the other hand, $P_{31}$ is in error then the inputs to the AND gates are 0 and 1 respectively and the 0 applied to the adder will result in the bit $P'_1$ being passed on without inversion as the corrected bit $B''_1$.

Referring back to FIG. 11, the circuit described therein operates as follows. It should be noted that if the lead X connected to one of the inputs of AND gate 17 is provided with a binary 1 signal, the flow diagram of FIG. 3 applies, whilst if lead X carries a 0, then the flow diagram of FIG. 4 applies. Initially it will be assumed that a binary 1 is applied to lead X.

Assume first that the overall parity of the bits $B_1$ to $B_{31}$ is even. This corresponds to the path in FIG. 3 leading to the exit $E_1$ of block 12. Bistable circuit 28 generates the corresponding bits $P_1$ to $P_{31}$ in series and these are assembled by the shift register 127 in plural error decoder 34. The bit $P_{31}$ represents the overall parity of signal bits $B_1$ to $B_{31}$ so that in this case $P_{31}$ is 0 and is applied over lead $P_{31}$ to the control input terminal of the gate 33.

The 31 bits are passed from the shift register 127 to the BCH decoder 128 where they are processed in parallel and the corrected bits $B''_1 - B''_{20}$ are passed to the selector 36. The corrected signal bit $B''_1$ is the corrected phase bit $P'_1$, the corrected signal bit $B''_2$ is the sum modulo 2 of the corrected phase bits $P'_1$ and $P'_2$ ... and so forth, the corrected signal bit $B''_{20}$ being the sum modulo 2 of the corrected phase bits $P'_{19}$ and $P'_{20}$.

Where the parity is even, it is presently assumed the remaining corrected phase bits $P'_{21}$ to $P'_{31}$ are not required, the corrected phase bit $P'_{31}$ would, however, be required if the overall parity of signals bits $B_1$ to $B_{31}$ were odd.

The 20 message bit signal portion of bit signal block $B_1$ to $B_{31}$ is assembled in assembling circuit 27 and the 20 message bits $B_1$ to $B_{20}$ are passed in parallel through the single error correcting circuit 29 to the selector circuit 36. If syndrome generator 31 indicates an error anywhere in these last mentioned bits, then the appropriate bit is reversed by the single error correcting circuit 29, otherwise the 20 message bit signals are passed unchanged through the single error correcting circuit 29. If the syndrome is recognised by the syndrome comparator 31 as corresponding to a single error, lead S from the output of OR gate 32 bears a binary 1. If, in addition, the overall parity is odd, lead $P_{31}$ from plural error decoder 34 to AND gate 33, and therefore control lead A of selector circuit 36 carries a binary 1, which causes the selector circuit 36 to select the block of bits $B'_1$ to $B'_{20}$ from the single error correcting circuit 29 rather than the block of bits $B''_1$ to $B''_{20}$ from the plural error decoding circuit 34. Each output bit is selected by a unit such as that shown in FIG. 16 which consists of two "AND NOT" gates 43 and 44. The AND terminal of the "AND NOT" gate 43 is connected to one of the output leads $B''_1$ to $B''_{20}$ of the plural error decoding circuit 34, whilst the "NOT" gate of the gate 43 is connected to the output terminal of bistable circuit 35. The AND terminal of gate 44 is connected to the output terminal of bistable circuit 35, whilst the AND terminal of gate 44 is connected to one of the output leads $B'_1$ to $B'_{20}$ from the single error correcting circuit 34.

If, on the other hand, the overall parity is odd, the action of the plural error decoding circuit 34 is more complex, the stated process in the flow diagram of FIG. 3 is "reverse $B_1$, generate $P_1$ to $P_{31}$, BCH decode, generate the corrected $B''_1$ to $B''_{20}$ and, if $P_{31}$ was in error, then reverse $B''_1$". This, as has already been mentioned, is the equivalent of the operations carried out in the circuit shown in FIG. 14.

Mention has previously been made of the function of signals applied to input lead X of AND gate 33. All single errors will be decodable only if lead X is provided with binary 1 or if it is omitted from the arrangement altogether, this latter normally being the base. Lead X is normally included if the decoder may find use for decoding transmissions which will not contain single errors except when a double error occurs across a block boundary. If, for example, a very highly stable reference phase oscillator were used, then a system operation in accordance with the flow diagram of FIG. 4 would be preferred, in which case lead X would either be omitted or be provided with a 0 signal. The difference between the two modes of operation set out in the flow diagram of FIGS. 3 and 4 is that of 435 error patterns which may be considered to be errors in $B_1$ plus two double errors, 11 of these have the same syndrome as single errors. If lead X is provided with binary 1 the syndrome would be attributed to a single error. If, on the other hand, the lead X is omitted together with the now redundant blocks 32, 33 and 35, then the syndrome would be attributed to a double error.

An output is provided on a lead labeled U of the BCH decoder 28 of the plural error decoder circuits 34 if the decoder is unable to interpret the received bits. As will be recalled, the lead U is connected to one of the input terminals of the OR gate 35. The carrying of a binary 1 on lead U modifies the action of the selector circuit 36 for two purposes. Firstly, if the errors are beyond the capability of the code to correct, but recognisably so, then the uncorrected message bit signal portion is passed on for utilisation as this may be of some value. Secondly, if the lead U to AND gate 33 carries a 0, it may be that single errors are highly impracticable but not impossible so that 15 single errors which do not have the same syndrome as some other error will still be decoded. If the occurrence of single errors is positively impossible, then the second purpose for which lead U is used could introduce an additional error by changing what is in fact a corrected bit. The occurrence of such an additional error can be prevented by disconnecting the syndrome generator 30 from the output lead $p$ from the bistable circuit 28 so that a binary 1 on lead U causes the actions to be performed which lead to exit 5 in the flow diagram of FIG. 4. The five single errors not considered immediately above are all equivalent to more complex errors and will not be decoded.

I claim:

1. A method of data handling for correcting errors arising in a transmission channel in a system in which double adjacent errors are predominant, which comprises the steps of:
   a. transmitting a succession of K data bits as a codeword of N bits $B_1$ to $B_n$ where $N > K$ and where the bits $B_1$ to $B_n$ are related to bits $P_1$ to $P_n$ of a codeword of any code capable of correcting errors occurring at random by the fact that each $i$th term $P_i$ is equal to the cumulative sum modulo 2 of the terms $B_1$ to $B_i$ and that the last bit $P_n$ of each codeword $P_1$ to $P_n$ has the same value, i.e., 0 or 1;
   b. receiving the transmitted codeword and recovering therefrom the codeword $P_1$ to $P_n$ or its inverse by cumulatively summing the received bits $B_1$ to $B_n$;
   c. correcting for double adjacent errors introduced by the transmission of step (a) by decoding said recovered codeword according to said code capable of correcting errors occurring at random to produce a corrected codeword $B_1$ to $B_n$; and
   d. recovering the K data bits from the corrected codeword.

2. A method as claimed in claim 1, in which the bits $P_1$ to $P_n$ are the codewords of a BCH code.

3. A method as claimed in claim 1, in which the code to which the codewords $P_1$ to $P_n$ belong is such that if any word belongs to the code then so does its inverse.

4. A method of data handling for correcting errors arising in a transmission channel in a system in which double adjacent errors are predominant, which comprises the steps of:
   a. transmitting a codeword of N bits $B_1$ to $B_n$ to represent a plurality K of data bits where $N > K$ and where there are N - K parity bits, the bits $B_1$ to $B_n$ of the transmitted codeword being related to the bits $P_1$ to $P_n$ of a codeword of any code capable of correcting errors occurring at random by the fact that each $i^{th}$ term $P_i$ is equal to the cumulative sum modulo 2 of the terms $B_1$ to $B_i$ and that the last bit $P_n$ of any codeword $P_1$ to $P_n$ has the same value;
   b. receiving the transmitted codeword and checking the parity thereof;
   c. correcting single errors in the K data bits of the received coreword to provide a corrected data bit word $B'_1$ to $B'_k$;
   d. recovering the codeword $P_1$ to $P_n$ or its inverse corresponding to the received codeword $B_1$ to $B_n$ and decoding the recovered codeword according to said code to provide a corrected data bit word $B''_1$ to $B''_k$; and
   e. selecting one of the corrected data bit words $B'_1$ to $B'_k$ and $B''_1$ to $B''_k$ according to the parity check of step (b)

5. The method according to claim 4 wherein said code is a BCH code.

6. The method according to claim 5 wherein the transmission of step (a) is effected by delta phase shift keying modulation.

7. The method according to claim 4 wherein the transmission of step (a) is effected by delta phase shift keying modulation.

8. A method of data handling for correcting errors arising in a transmission channel in a system in which double adjacent errors are predominant, which comprises the steps of:
   a. encoding successive sets of K data bits as successive first codewords of N bits containing N - K parity bits;
   b. transmitting said successive codewords by delta phase shift keying modulation to form second codewords of an error correcting code capable of correcting errors occurring at random and in which the last bit of each second codeword is of the same value;
   c. receiving the transmitted codewords to recover the first codewords, and checking the parity thereof;
   d. generating said second codewords from the recovered first codewords and decoding them according to said code to produce a corrected sequence of said K data bits when the parity check of step (c) indicates that double adjacent errors have occurred during transmission.

* * * * *